United States Patent
Gremplini et al.

(10) Patent No.: US 7,712,594 B2
(45) Date of Patent: May 11, 2010

(54) DUAL CLUTCH ARRANGEMENT FOR A DUAL CLUTCH TRANSMISSION

(75) Inventors: Hansi Gremplini, Oppenweiler (DE); Kuno Fronius, Lauffen (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 523 days.

(21) Appl. No.: 11/712,053

(22) Filed: Feb. 28, 2007

(65) Prior Publication Data

US 2007/0240961 A1 Oct. 18, 2007

(30) Foreign Application Priority Data

Feb. 28, 2006 (DE) .................. 10 2006 010 113

(51) Int. Cl.
*F16D 25/10* (2006.01)
*F16D 25/08* (2006.01)

(52) U.S. Cl. .............................. 192/87.11; 192/85 CA; 192/87.15

(58) Field of Classification Search ............... 192/87.11
See application file for complete search history.

(56) References Cited

U.S. PATENT DOCUMENTS

| | | | | |
|---|---|---|---|---|
| 6,491,149 B1 * | 12/2002 | Kundermann et al. | ...... | 192/48.9 |
| 7,036,645 B2 * | 5/2006 | Sowul et al. | ............. | 192/48.91 |
| 7,293,637 B2 * | 11/2007 | Janson et al. | ............. | 192/87.11 |
| 2001/0035328 A1 * | 11/2001 | Tanikawa | .................. | 192/87.11 |
| 2004/0206599 A1 | 10/2004 | Hegerath | | |
| 2005/0189195 A1 * | 9/2005 | Heinrich et al. | .......... | 192/87.11 |
| 2006/0086586 A1 * | 4/2006 | Braford | .................... | 192/87.11 |

FOREIGN PATENT DOCUMENTS

| | | |
|---|---|---|
| DE | 102 23 780 C1 | 10/2003 |
| DE | 10 2004 013 265 A1 | 3/2005 |
| DE | 10 2004 061 020 A1 | 7/2005 |
| DE | 10 2005 025 772 | 1/2006 |
| DE | 10 2004 055 361 A1 | 5/2006 |
| EP | 1 195 537 | 4/2002 |
| EP | 1 568 906 A1 | 8/2005 |
| FR | 2 851 627 | 8/2004 |
| GB | 2 369 416 | 5/2002 |
| WO | WO 03/027 525 | 4/2003 |

OTHER PUBLICATIONS

European Search Report dated Jun. 8, 2007; Application No. 10 2006 010 113.8.

* cited by examiner

*Primary Examiner*—David D Le
*Assistant Examiner*—Ryan Dodd
(74) *Attorney, Agent, or Firm*—Knobbe, Martens, Olson & Bear, LLP

(57) ABSTRACT

Dual clutch arrangement for a dual clutch transmission. The dual clutch arrangement has a housing, an input shaft, a first friction clutch, a second friction clutch, two output shafts, a hub which is fixed to the housing, a first piston/cylinder arrangement which is fixed to the housing, and a second piston/cylinder arrangement which is fixed to the housing. Input members of the friction clutches are connected to the input shaft. Output members of the friction clutches in each case are connected to one of the two output shafts. It is possible for the friction clutches to be actuated in each case by means of one of the piston/cylinder arrangements, which are fixed to the housing.

At least one of the input members is rotatably mounted by means of a radial bearing arrangement on the hub which is fixed to the housing.

16 Claims, 2 Drawing Sheets

DUAL CLUTCH ARRANGEMENT FOR A DUAL CLUTCH TRANSMISSION

BACKGROUND OF THE INVENTION

The present invention relates to a dual clutch arrangement for a dual clutch transmission, having an input shaft, a first friction clutch, a second friction clutch, two output shafts, a hub which is fixed to the housing, a first piston/cylinder arrangement which is fixed to the housing, and a second piston/cylinder arrangement which is fixed to the housing, with input members of the friction clutches being connected to the input shaft, with output members of the friction clutches in each case being connected to one of the two output shafts, and with it being possible for the friction clutches to be actuated in each case by means of one of the piston/cylinder arrangements, which are fixed to the housing, and an axial bearing.

Dual clutch transmissions have a dual clutch arrangement and two partial transmissions. The partial transmissions are generally designed as spur gear transmissions. Here, one of the partial transmissions is assigned to the even gear stages, and the other is assigned to the odd gear stages.

It is possible, by means of overlapping actuation of the two clutches of the dual clutch arrangement, to carry out a gearshift without an interruption in tractive force.

Said type of dual clutch transmission is suitable for motor vehicles, in particular for passenger vehicles.

Nowadays, fluidically operated (wet) friction clutches, for example wet-running multiplate clutches, are generally used in dual clutch arrangements.

A dual clutch arrangement is known from DE 10 2004 013 265 A1, in which dual clutch arrangement the two friction clutches are assigned in each case one jointly-rotating actuating piston, and with the actuating pistons having a first radial active face which faces towards a piston space which can be acted on with pressure, and a second radial active face which faces towards a centrifugal force pressure compensation space. Fluid is supplied to the piston spaces via a jointly-rotating hub and a rotary leadthrough which is arranged between said hub and the housing.

A disadvantage of said type of dual clutch arrangement is the fact that it is relatively highly complex and produces high drag torques.

A comparable dual clutch arrangement is known from DE 102 23 780 C1.

It is known from DE 10 2004 061 020 A1 to provide two piston/cylinder arrangements, which are nested one inside the other radially and act in the same direction, so as to be fixed to the housing on a hub which is fixed to the housing. The piston/cylinder arrangements act via lever arrangements on the friction clutches, which are likewise nested one inside the other radially, of the dual clutch arrangement.

An input member of the radially outer friction clutch is rotatably mounted on a section of the first output shaft (inner output shaft) which extends in the direction to the crankshaft.

SUMMARY OF THE INVENTION

Against the above background, it is the object of the present invention to specify an improved dual clutch arrangement for a dual clutch transmission.

Said object is achieved in the dual clutch arrangement stated in the introduction in that at least one of the input members is rotatably mounted by means of a radial bearing arrangement on the hub which is fixed to the housing.

Here, the at least one input member can be directly or indirectly mounted.

This results overall in a considerably more favourable bearing pattern of the bearing.

It is particularly advantageous if at least one of the input members is connected to a rotary member which is rotatably mounted by means of the radial bearing arrangement on the hub which is fixed to the housing.

The rotary member can be connected in one piece to the at least one input member or can be embodied as a separate part.

It is also advantageous if the radial bearing arrangement has two radial bearings which are spaced apart from one another axially.

With said arrangement, it is possible for axial forces to also be absorbed in the radial bearing arrangement, so that the at least one input member or rotary member can be axially fixed in a favourable way.

According to a further embodiment, it is provided here that the radial bearings are sealed off, with a space in between serving to guide cooling fluid.

With said embodiment, it is possible in a particularly favourable manner in terms of design to supply cooling fluid to the friction clutches via the radial bearing arrangement.

It is also preferable for no rotary leadthrough or the like to be required for supplying cooling fluid. It is additionally the case that the cooling fluid can be supplied from the radially inner side via the hub which is fixed to the housing, and can then be supplied in an optimum way to the friction clutches via the rotary member and the input member, respectively, and the centrifugal forces acting thereon.

It is also preferable overall if the first and second piston/cylinder arrangements are arranged on opposite sides of the radial bearing arrangement.

It is possible overall for a substantially symmetrical arrangement to be obtained in which the forces which occur can be guided or absorbed in a favourable manner.

For similar reasons, it is also advantageous if the first and the second piston/cylinder arrangements act in opposite directions.

The embodiment of a dual clutch arrangement with piston/cylinder arrangements which are fixed to the housing and act in opposite directions is also considered to be a separate invention independent of the mounting of the input members, that is to say in particular independent of whether at least one of the input members is rotatably mounted by means of a radial bearing arrangement on the hub which is fixed to the housing.

The action in opposite directions offers many advantages with regard to the symmetrical design and the modularity which can be obtained (it is possible, for example, for substantially identical or mirror-symmetrically arranged piston/cylinder arrangements to be used).

It is advantageous overall if the piston/cylinder arrangements are mounted directly on the outer periphery of the hub which is fixed to the housing.

The hub, which preferably extends radially within the friction clutches, can support the piston/cylinder arrangements on its outer periphery. It is also advantageous here that the axial bearing can be designed to have a relatively small radius.

According to a further preferred embodiment, the friction clutches are in each case pre-loaded in the opening direction by means of a spring arrangement.

Here, the axial bearings accordingly serve as engagement bearings, since the corresponding force for closing (engaging) the friction clutches is applied via the axial bearings.

Here, it is particularly advantageous if at least one of the spring arrangements is supported on a rotary member which is rotatably mounted by means of the radial bearing arrangement on the hub which is fixed to the housing.

This further reduces the component complexity, since the support can be provided by a structural element which is generally provided in any case.

In the embodiment with two piston/cylinder arrangements on opposite sides and with opposite directions of action, both spring arrangements can preferably be supported on the rotary member (from opposite sides).

According to a further preferred embodiment, the second friction clutch is arranged radially within the first friction clutch. This permits an axially short design.

Here, it is advantageous if the input member of the first friction clutch has a radially outwardly arranged plate carrier.

It is also advantageous if the input member of the second friction clutch has a radially inwardly arranged plate carrier.

In an alternative embodiment, the second friction clutch is arranged axially adjacent to the first friction clutch.

This permits a radially compact design.

Here, it is particularly advantageous if the input member of the first friction clutch has a radially inwardly arranged plate carrier.

This permits a favourable connection to the radial bearing arrangement.

It is therefore also advantageous if the input member of the second friction clutch has a radially inwardly arranged plate carrier.

It is preferable overall in the case of said alternative embodiment if a rotary member which is mounted by means of the radial bearing arrangement on the hub is connected to a common input member of the first and second friction clutches.

This allows the component complexity to be further reduced.

The dual clutch arrangement according to the invention makes it possible overall to achieve at least one of the following advantages:

A reduced level of component complexity is provided.

The production costs are lower.

Lower drag torques result.

No centrifugal force compensation spaces are necessary, since no rotating pistons are provided.

A rotary leadthrough is not necessary, so that undefined leakages are also eliminated.

The actuator arrangement of the dual clutch arrangement can be of modular design.

The same actuator arrangement can be used for different dual clutch arrangements, in particular not only for dual clutch arrangements with wet-running friction clutches but also for dual clutch arrangements for dry-running friction clutches.

It is self-evident that the features stated above and the features yet to be explained in the following can be used not only in the respectively specified combination but also in other combinations or individually without departing from the scope of the present invention.

BRIEF DESCRIPTION OF THE SEVERAL VIEWS OF THE DRAWINGS

Exemplary embodiments of the invention are illustrated in the drawing and are explained in more detail in the following description. In the drawing.

DETAILED DESCRIPTION OF THE INVENTION

Figure 1:
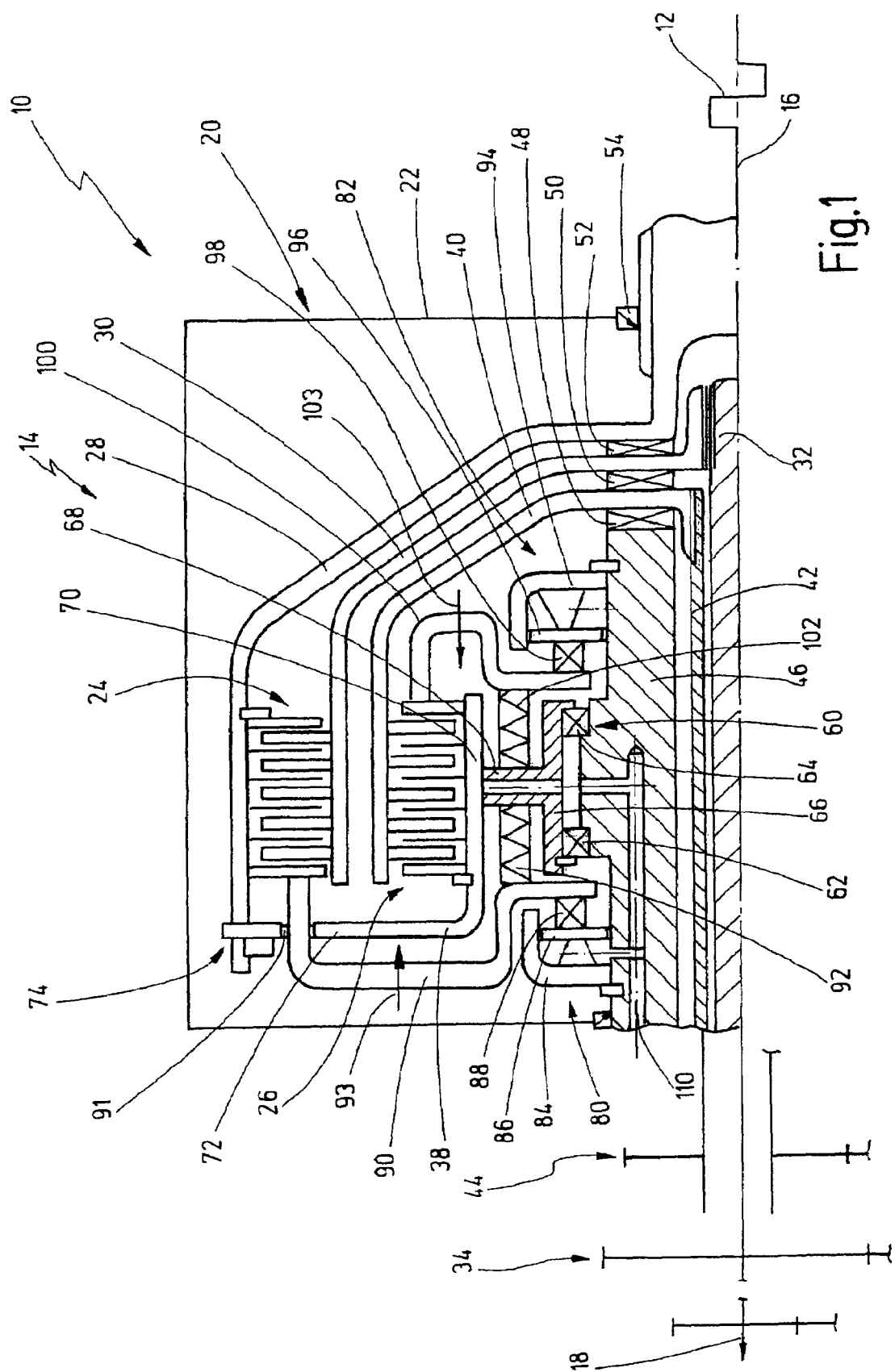
FIG. 1 is a schematic illustration of a drivetrain for a motor vehicle having a dual clutch arrangement according to one embodiment of the present invention.

In FIG. 1, a drivetrain for a motor vehicle is denoted generally by 10.

The drivetrain 10 has a drive engine, such as an internal combustion engine 12, and a dual clutch transmission 14. The input of the dual clutch transmission 14 is connected to the crankshaft 16 of the internal combustion engine 12. The dual clutch transmission 14 has an output shaft 18 which can be connected in a manner known per se to drive wheels of the vehicle.

The dual clutch transmission 14 has a dual clutch arrangement 20 which is held in a housing 22. The dual clutch arrangement 20 contains a first friction clutch 24 and a second friction clutch 26. The two friction clutches 24, 26 are arranged so as to be nested one inside the other radially, with the first friction clutch 24 being situated radially at the outside.

The first friction clutch 24 has a first input member 28 which is connected to the input, that is to say the crankshaft 16. The first input member 28 extends axially forward in the manner of a cage. The two friction clutches 24, 26 are arranged radially within the first input member 28.

The first friction clutch 24 also has a first output member 30. The first output member 30 is connected to a first output shaft 32 of the dual clutch arrangement. The first output shaft 32 is embodied as a solid shaft and is connected to a first partial transmission 34 of the dual clutch transmission 14.

The first output member 30 is likewise designed in the manner of a housing cage and extends radially within the first input member 28, with the first friction clutch 24 being held in between.

The second friction clutch 26 has a second input member 38. The second input member 38 is rotationally fixedly connected to the first input member 28. The second friction clutch 26 also has a second output member 40. The second output member 40 is likewise designed in the manner of a housing cage and extends radially within the first output member 30. The second output member 40 is connected to a second output shaft 42 which, as a hollow shaft, is arranged concentrically to the first output shaft 32. The second output shaft 42 is connected to a second partial transmission 44 of the dual clutch transmission 14.

The first input member 28, the first output member 30 and the second output member 40 extend, as stated above, in the manner of housing cages from the region of the crankshaft 16 in the direction of the partial transmissions 34, 44. The dual clutch arrangement 20 also has a hub 46 which is fixed to the housing and extends in the axial direction from the region of the partial transmissions 34, 44 in the direction of the region of the crankshaft 16, that is to say arranged radially in the cage-shaped second output member 40. Here, the hub 46 which is fixed to the housing is arranged coaxially to the two output shafts 32, 42 and surrounds the latter.

A first axial bearing 48 is arranged between an end side of the hub 46 which is fixed to the housing and a radial section of the second output member 40. A second axial bearing 50 is arranged between the rear side of said second output member radial section and a radial section of the first output member 30. A third axial bearing 52 is arranged between the rear side of the first output member radial section and a radial section of the first input member 28. The axial bearings 48, 50, 52 are aligned in the radial direction approximately with the hub 46 which is fixed to the housing.

A shaft seal 54 is provided between the housing 22 of the dual clutch arrangement 20 and the crankshaft 16.

The housing 22 is connected at the other axial side to the hub 46 which is fixed to the housing, so that a closed-off space is formed overall. Shaft seals likewise provided, if appropriate, between the hub 46 which is fixed to the housing and the second output shaft 42, and between the second output shaft 42 and the first output shaft 32, are not illustrated.

The first and second partial transmissions 34, 44 are designed as spur gear transmissions, as are known per se from the prior art. The first partial transmission 34 contains, for example, even gear stages, and the second partial transmission 44 contains, for example, odd gear stages.

A radial bearing arrangement 60 is provided for mounting the second input member 38 and therefore indirectly also the first transmission member 28. The radial bearing arrangement 60 has a first radial bearing 62 and, arranged spaced apart from the latter axially, a second radial bearing 64, the inner rings of which radial bearings are connected to the hub 46 which is fixed to the housing. The two radial bearings 62, 64 serve to mount, in the radial direction, a rotary member 66 which has a radially outwardly projecting radial web 68.

Although the radial bearings 62, 64 absorb substantially radial forces, the rotary member 66 is fastened to said radial bearings in such a way that the rotary member 66 is also guided axially by the radial bearings 62, 64.

The radial web 68 is connected to the second input member 38, more specifically to an axial member 70 of the second input member 38.

The axial member 70 serves as an inner plate carrier for the second friction clutch 26, and is connected to a radial member 72. The radial member 72 extends radially outwards from the axial end adjacent to the partial transmissions 34, 44, and is connected by means of a rotationally fixed coupling 74 to an axially projecting section of the first input member 28. Said axially projecting section of the first input member 28 serves as an outer plate carrier for the first friction clutch 24.

An axially projecting section of the first output member 30 serves as an inner plate carrier for the first friction clutch 24.

Radially adjacent to this, an axially extending section of the second output member 40 serves as an outer plate carrier of the second friction clutch 26.

A first piston/cylinder arrangement 80 and a second piston/cylinder arrangement 82 are provided for actuating the two friction clutches 24, 26. The piston/cylinder arrangements 80, 82 are arranged on opposite sides of the radial bearing arrangement 60 or of the rotary member 66.

The first piston/cylinder arrangement 80 has a first cylinder 84 which is rigidly connected to the hub 46 which is fixed to the housing. The first piston/cylinder arrangement 80 also has a first piston 86 which is mounted so as to be displaceable in the axial direction in the first cylinder 84. A cylinder space which is formed in this way is connected to a supply line by means of a radial bore (not illustrated in any more detail) within the hub 46 which is fixed to the housing.

The outer side of the first piston 86 is connected by means of a first engagement bearing 88 to a first pressure plate 90. The first pressure plate 90 extends radially outward and has an axial section which is designed to apply a force axially to the first friction clutch 24. The first pressure plate 90 rotates with the first and the second input members 28, 38. The speed difference in relation to the first piston 86, which is fixed to the housing, is absorbed by the engagement bearing 88 which is embodied as an axial bearing.

The axial section of the first pressure plate 90, which connects to the plates of the first friction clutch 24, extends through an opening 91 in the radial member 72 of the second input member 38. In one exemplary embodiment which is realized in design terms, a plurality of openings 91 of said type are generally provided, which openings 91 are arranged distributed over the periphery of the first pressure plate 90.

A first spring arrangement 92 is arranged on the opposite side of the first pressure plate 90 from the first engagement bearing 88. The first spring arrangement 92 is supported on a radial web 68 of the rotary member 66 and presses the first pressure plate 90 in the axial direction away from the radial web 68, in the direction of the partial transmissions 34, 44. In order to actuate the first friction clutch 24, the first piston/cylinder arrangement 80 is supplied with hydraulic fluid, so that the first piston 86 is moved in the opposite direction and consequently exerts a first axial force 93 via the first pressure plate 90 on the plate stack of the first friction clutch 24.

The second piston/cylinder arrangement 82 is constructed in a corresponding way so as to be approximately mirror-symmetrical with respect thereto. The first and second piston/cylinder arrangements 80, 82 can accordingly be provided using similar or identical components, so as to give a high degree of modularity.

The second piston/cylinder arrangement 82 accordingly has a second cylinder 94 which is fixedly connected, specifically substantially adjacent to the second output member 40, to the hub 46 which is fixed to the housing.

The second piston/cylinder arrangement 82 also has a second piston 96 which acts via a second engagement bearing 98 on a second pressure plate 100. An axial section of the second pressure plate 100 bears against the plate stacks of the second friction clutch 26. The second piston/cylinder arrangement 82 can accordingly exert a second axial force 103 on the second friction clutch 26, with the second axial force 103 being aligned in the opposite direction to the first axial force 93.

A second spring arrangement 102 is provided between the radial web 68 of the rotary member 66 and the second pressure plate 100, which second spring arrangement 102 preloads the second pressure plate 100 in the direction to the crankshaft 16, that is to say in the disengagement direction of the second friction clutch 26. The radial bearings 60, 62 absorb the axial forces which the spring arrangements 92, 102 exert on the rotary member 68.

The cylinder space of the second piston/cylinder arrangement 82 is connected by means of ducts (not illustrated in any more detail) in the hub 46 to a hydraulic circuit (likewise not illustrated in any more detail in FIG. 1). FIG. 1 does however illustrate that ducts via which cooling fluid can be supplied to the friction clutches 24, 26 are also provided in the hub 46 which is fixed to the housing.

Here, the cooling fluid is supplied via ducts in the hub 46 to a space between the two radial bearings 62, 64 and to radial ducts in the rotary member 66 and into the friction clutches 24, 26. It is self-evident that suitable radial openings are provided in each case in the input and output members 38, 30, 40 in order to ensure a suitable supply of flow to the plates.

Here, the radial ducts in the rotary member 66 can extend through the radial web 68.

It is self-evident that in said embodiment, the radial bearings 62, 64 are preferably embodied as sealed bearings.

While in FIG. 1 the friction clutches 24, 26 are illustrated as wet-running multiplate clutches, it is self-evident that the design of the dual clutch arrangement 20 according to the invention is also applicable for dry-running friction clutches.

In said case, it would for example be possible for cooling air to be supplied via ducts which, in the case of wet-running clutches, are used to supply cooling oil.

It is thus possible to construct a modular system for dual clutch arrangements equipped with wet-running or dry-running friction clutches. The basic design can be used here for one or the other variant.

Hydraulic fluid for actuating the piston/cylinder arrangements 80, 82 can be supplied via the hub 46 which is fixed to the housing, so that no leakages occur as would be the case with a rotary leadthrough. Leakages required for closed-loop control can be provided in the hydraulic circuit by defined apertures.

Since there are fewer rotating components as a result of the fixed piston/cylinder arrangements, lower drag torques result. As a result of the low complexity, the dual clutch arrangement can also be produced with low production costs. In addition, no centrifugal force compensation spaces are necessary, since the piston/cylinder arrangements 80, 82 are designed so as to be fixed and do not rotate.

The general design of the dual clutch arrangement 20 with the fixed hub 46 can also be used to operate a mechanical pump or other assemblies.

For clarity of the illustration, the abovementioned fluid ducts in the hub 46 which is fixed to the housing are denoted overall by 110 in FIG. 1. It is however self-evident that said fluid ducts can comprise different fluid lines and can be arranged so as to be distributed radially over the periphery of the hub 46 which is fixed to the housing.

Figure 2:
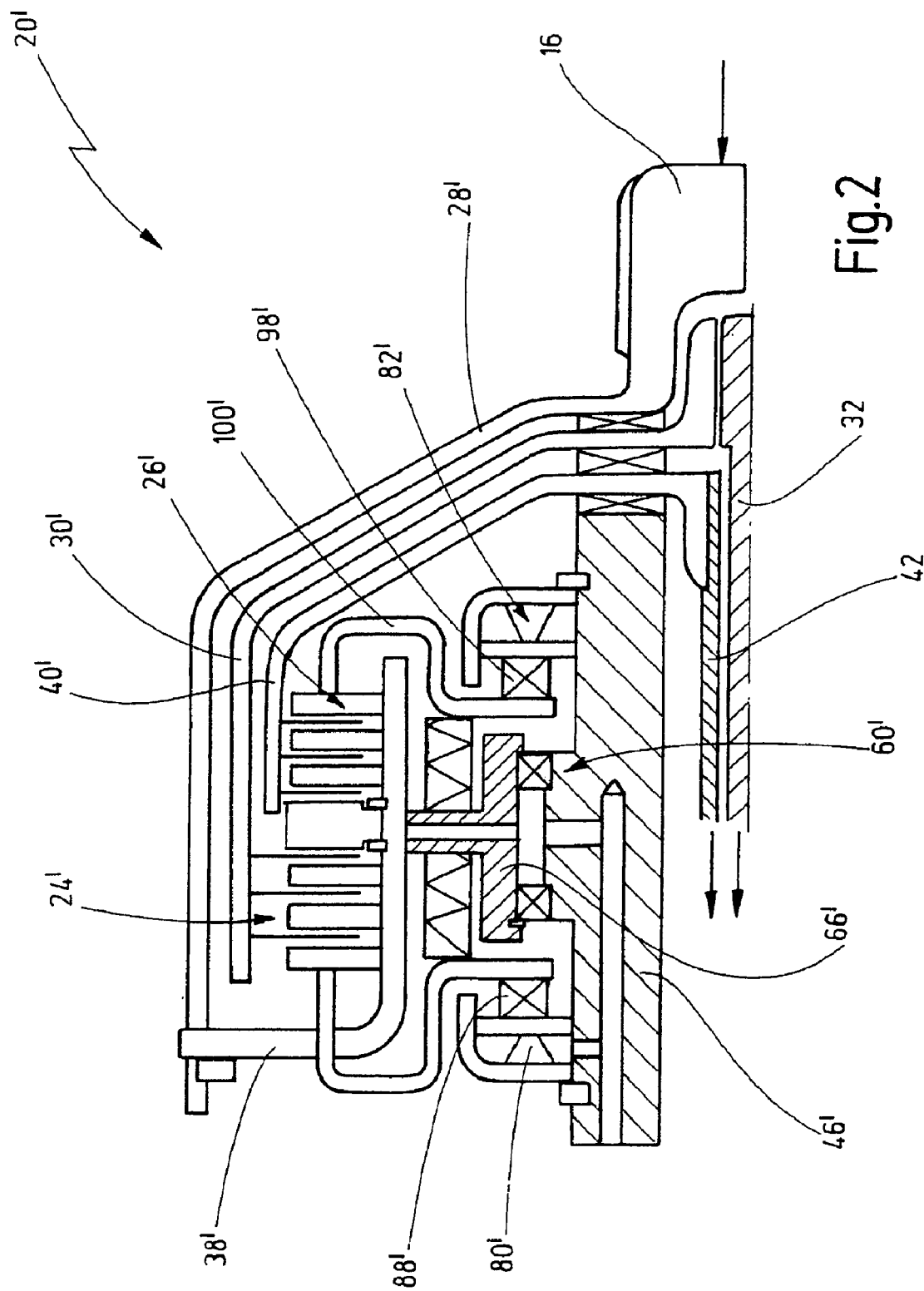
FIG. 2 shows a schematic view of a dual clutch arrangement according to a further embodiment of the present invention.

FIG. 2 shows an alternative embodiment of a dual clutch arrangement 20' according to the invention.

The general design and the general mode of operation correspond to the dual clutch arrangement 20 of FIG. 1, so that only the differences are discussed in the following.

In the dual clutch arrangement 20', the first friction clutch 24' and the second friction clutch 26' are arranged adjacent to one another in the axial direction. This makes a radially compact design possible.

The first input member 28' is rotationally fixedly connected to the second input member 38'. In the present case, the second input member 38' serves as an inner plate carrier both of the first friction clutch 24' and also of the second friction clutch 26'.

It can be seen that the design of the piston/cylinder arrangements 80', 82' can be identical to that in the dual clutch arrangement 20 of FIG. 1. This makes an increased degree of modularity possible. It is possible with the same basic design to construct both a dual clutch arrangement 20 with friction clutches nested one inside the other radially and also a dual clutch arrangement with friction clutches arranged axially adjacent to one another.

Here, it is possible for many parts to be identical, for example also the second pressure plate 100', the second output member 40' of the second friction clutch 26', etc.

What is claimed is:

1. A dual clutch arrangement for a dual clutch transmission, having a housing, an input shaft, a first friction clutch, a second friction clutch, two output shafts, a hub which is fixed to the housing, a first piston/cylinder arrangement having a first cylinder arrangement which is fixed to the housing through the hub, and a second piston/cylinder arrangement having a second cylinder arrangement which is fixed to the housing through the hub, with input members of the friction clutches being connected to the input shaft, with output members of the friction clutches in each case being connected to one of the two output shafts, and with it being possible for the friction clutches to be actuated in each case by means of one of the piston/cylinder arrangements, and an axial bearing, wherein at least one of the input members is rotatably mounted by means of a radial bearing arrangement on the hub which is fixed to the housing, wherein at least one of the input members is connected to a rotary member which is rotatably mounted by means of the radial bearing arrangement on the hub which is fixed to the housing;

wherein the first and second piston/cylinder arrangements are arranged on opposite sides of the radial bearing arrangement.

2. The dual clutch arrangement according to claim 1, wherein the radial bearing arrangement has two radial bearings which are spaced apart from one another axially.

3. The dual clutch arrangement according to claim 2, wherein the radial bearings are sealed off, with a space in between serving to guide cooling fluid.

4. The dual clutch arrangement according to claim 1, wherein the first and second piston/cylinder arrangements act in opposite directions.

5. The dual clutch arrangement according to claim 1, wherein the piston/cylinder arrangements are mounted directly on the outer periphery of the hub which is fixed to the housing.

6. The dual clutch arrangement according to claim 1, wherein the friction clutches are in each case pre-loaded in the opening direction by means of a spring arrangement.

7. The dual clutch arrangement according to claim 6, wherein at least one of the spring arrangements is supported on a rotary member which is rotatably mounted by means of the radial bearing arrangement on the hub which is fixed to the housing.

8. The dual clutch arrangement according to claim 1, wherein the second friction clutch is arranged radially within the first friction clutch.

9. The dual clutch arrangement according to claim 8, wherein the input member of the first friction clutch has a radially outwardly arranged plate carrier.

10. The dual clutch arrangement according to claim 8, wherein the input member of the second friction clutch has a radially inwardly arranged plate carrier.

11. The dual clutch arrangement according to claim 1, wherein the second friction clutch is arranged axially adjacent to the first friction clutch.

12. The dual clutch arrangement according to claim 11, wherein the input member of the first friction clutch has a radially inwardly arranged plate carrier.

13. The dual clutch arrangement according to claim 11, wherein the input member of the second friction clutch has a radially inwardly arranged plate carrier.

14. The dual clutch arrangement according to claim 11, wherein a rotary member which is mounted by means of the radial bearing arrangement on the hub is connected to a common input member of the first and second friction clutches.

15. A dual clutch arrangement for a dual clutch transmission, having a housing, an input shaft, a first friction clutch, a second friction clutch, two output shafts, a hub which is fixed to the housing, a first piston/cylinder arrangement having a first cylinder arrangement which is fixed to the housing through the hub, and a second piston/cylinder arrangement having a second cylinder arrangement which is fixed to the housing through the hub, with input members of the friction clutches being connected to the input shaft, with output members of the friction clutches in each case being connected to one of the two output shafts, and with it being possible for the friction clutches to be actuated in each case by means of the one of the piston/cylinder arrangements, and an axial bearing, wherein at least one of the input members is rotatably mounted by means of a radial bearing arrangement on the hub which is fixed to the housing, wherein the first and second piston/cylinder arrangements are arranged on opposite sides of the radial bearing arrangement.

16. A dual clutch arrangement for a dual clutch transmission, having a housing, an input shaft, a first friction clutch, a second friction clutch, two output shafts, a hub which is fixed to the housing, a first piston/cylinder arrangement having a first cylinder arrangement which is fixed to the housing through the hub, and a second piston/cylinder arrangement having a second cylinder arrangement which is fixed to the housing through the hub, with input members of the friction clutches being connected to the input shaft, with output members of the friction clutches in each case being connected to one of the two output shafts, and with it being possible for the friction clutches to be actuated in each case by means of one of the piston/cylinder arrangements, and an axial bearing, wherein at least one of the input members is rotatably mounted by means of a radial bearing arrangement on the hub which is fixed to the housing, wherein the piston/cylinder arrangements are mounted directly on the outer periphery of the hub and radially inside the friction clutches.

* * * * *